United States Patent
Kim et al.

(10) Patent No.: US 8,599,324 B2
(45) Date of Patent: Dec. 3, 2013

(54) LIQUID CRYSTAL DISPLAY APPARATUS AND ARRAY SUBSTRATE THEREOF

(75) Inventors: Sang-Geun Kim, Yongin (KR); Jerry Shim, Yongin (KR); Doo-In Nam, Yongin (KR); Gee-Hyun Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 125 days.

(21) Appl. No.: 13/200,320

(22) Filed: Sep. 23, 2011

(65) Prior Publication Data
US 2012/0133852 A1 May 31, 2012

(30) Foreign Application Priority Data
Nov. 25, 2010 (KR) .................. 10-2010-0118083

(51) Int. Cl.
*G02F 1/1333* (2006.01)

(52) U.S. Cl.
USPC .............................. 349/40; 349/150

(58) Field of Classification Search
None
See application file for complete search history.

(56) References Cited

U.S. PATENT DOCUMENTS

| | | | | |
|---|---|---|---|---|
| 2002/0163611 A1* | 11/2002 | Kamijima et al. | ............ | 349/122 |
| 2006/0097364 A1* | 5/2006 | Shinojima | ............ | 257/666 |
| 2008/0165300 A1* | 7/2008 | Sung et al. | ............ | 349/40 |
| 2009/0102364 A1 | 4/2009 | Suh et al. | | |
| 2009/0310051 A1 | 12/2009 | Kim | | |
| 2010/0079692 A1* | 4/2010 | Hwang et al. | ............ | 349/40 |

FOREIGN PATENT DOCUMENTS

| KR | 10 2008-0067535 A | 7/2008 |
|---|---|---|
| KR | 10 2009-0040658 A | 4/2009 |
| KR | 10 2009-0129803 A | 12/2009 |
| KR | 10 2010-0050355 A | 5/2010 |

* cited by examiner

*Primary Examiner* — Lucy Chien
(74) *Attorney, Agent, or Firm* — Lee & Morse, P.C.

(57) ABSTRACT

A liquid crystal display (LCD) apparatus having an improved wiring structure for preventing circuits from being damaged due to static electricity. The LCD apparatus includes an array substrate body on which a pixel electrode is disposed, a common voltage wiring formed on the array substrate body in order to apply a common voltage to a common electrode facing the pixel electrode, a driving integrated circuit (IC) for applying an appropriate driving voltage to the pixel electrode and the common electrode, and a flexible circuit board for connecting the driving IC and an external power source to each other, wherein the common voltage wiring is connected to the driving IC through the flexible circuit board. Accordingly, electrical shock applied to the driving IC due to static electricity is reduced, and thus circuits are prevented from being damaged, thereby reducing errors of products and improving reliability of products.

6 Claims, 3 Drawing Sheets

LIQUID CRYSTAL DISPLAY APPARATUS AND ARRAY SUBSTRATE THEREOF

CROSS-REFERENCE TO RELATED PATENT APPLICATION

This application claims the benefit of Korean Patent Application No. 10-2010-0118083, filed on Nov. 25, 2010, in the Korean Intellectual Property Office, the disclosure of which is incorporated herein in its entirety by reference.

BACKGROUND

1. Field

One or more aspects of present embodiments relate to liquid crystal display (LCD) apparatuses and array substrates thereof. More particularly, present embodiments relate to LCD apparatuses having an improved a wiring structure for preventing circuits from being damaged due to static electricity, and array substrates of the LCD apparatuses.

2. Description of the Related Art

In general, a liquid crystal display (LCD) apparatus includes an array substrate, a color filter substrate, and a liquid crystal layer disposed therebetween. As arrangement of liquid crystals of the liquid crystal layer is changed by a voltage applied between the array substrate and the color filter substrate, light emitted from a backlight is selectively transmitted through the liquid crystal layer so as to realize a desired image.

SUMMARY

One or more embodiments may be directed to liquid crystal display (LCD) apparatuses.

According to an embodiment, there is an array substrate of a liquid crystal display (LCD) apparatus, the array substrate including: a pixel electrode on an array substrate body; a common voltage wiring on the array substrate body in order to apply a common voltage to a common electrode facing the pixel electrode; a driving integrated circuit (IC) for applying an appropriate driving voltage to the pixel electrode and the common electrode; and a flexible circuit board for connecting the driving IC and an external power source to each other, wherein the common voltage wiring is connected to the driving IC through the flexible circuit board.

The common voltage wiring does not include a wiring without connection through the flexible circuit board for direct connection with the driving IC on the array substrate body.

The flexible circuit board may be connected to the driving IC through a connection pad on the array substrate body.

The array substrate may further include a dummy pad on a connection path for connecting the flexible circuit board and the driving IC to each other through the connection pad.

According to another embodiment, there is a LCD apparatus including a pixel electrode on an array substrate; a color filter substrate, a common electrode on the color filter substrate, the common electrode facing the pixel electrode; and a liquid crystal layer interposed between the array substrate and the color filter substrate, wherein the array substrate may include an array substrate body on which the pixel electrode is disposed; a common voltage wiring on the array substrate body that applies a common voltage to the common electrode facing the pixel electrode; a driving IC for applying an appropriate driving voltage to the pixel electrode and the common electrode; and a flexible circuit board for connecting the driving IC and an external power source to each other, wherein the common voltage wiring is connected to the driving IC through the flexible circuit board.

The common voltage wiring may not include a wiring without connection through the flexible circuit board for direct connection with the driving IC on the array substrate body.

The flexible circuit board may be connected to the driving IC through a connection pad on the array substrate body.

The LCD apparatus may further include a dummy pad on a connection path for connecting the flexible circuit board and the driving IC to each other through the connection pad.

BRIEF DESCRIPTION OF THE DRAWINGS

The above and other features of present embodiments will become more apparent by describing in detail exemplary embodiments thereof with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein.

Figure 1:
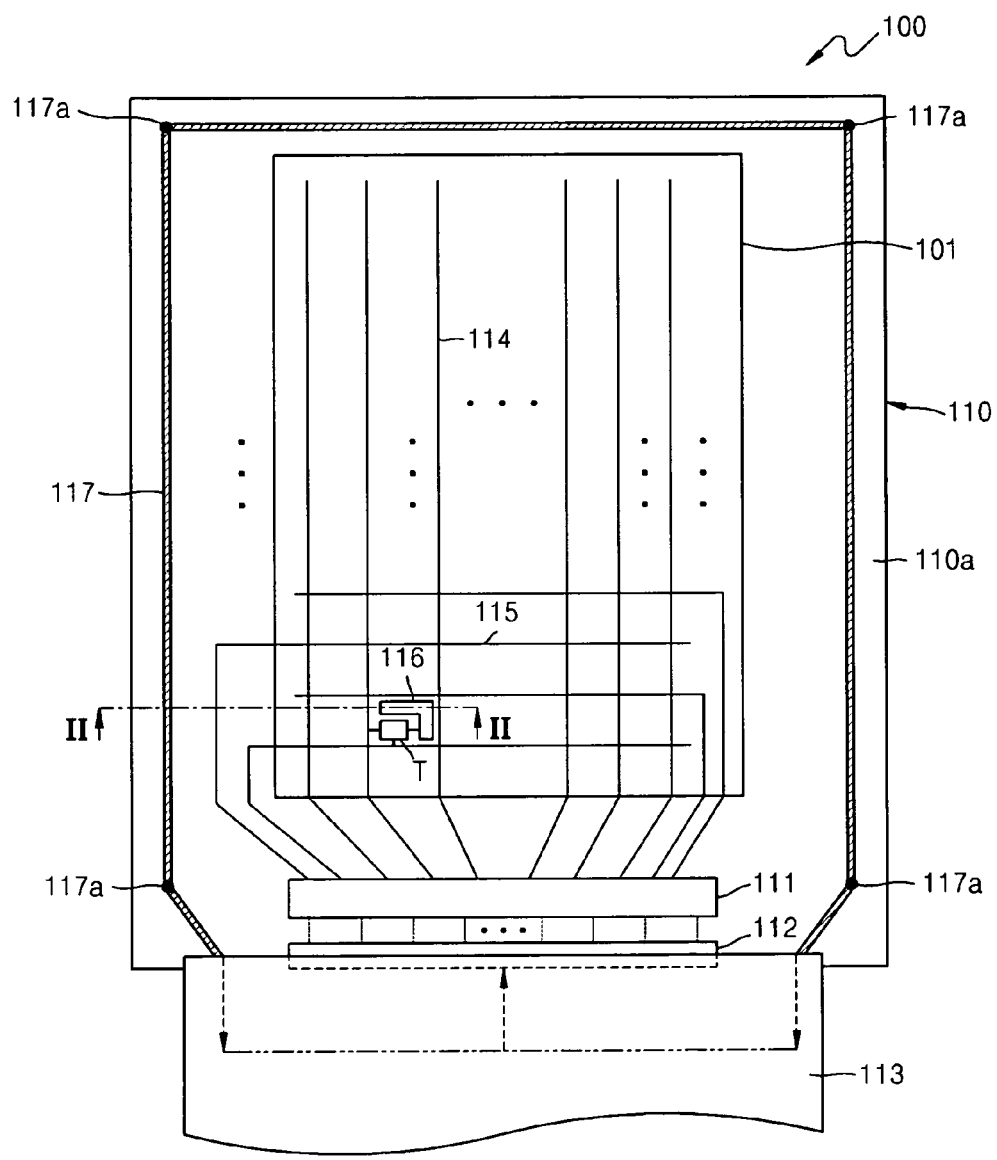
FIG. 1 is a plan view of a liquid crystal display (LCD) apparatus according to an embodiment.

FIG. 1 is a plan view of a liquid crystal display (LCD) apparatus 100 according to an embodiment.

In order to mainly show an array substrate 110, a liquid crystal layer 120 and a color filter substrate 130 are omitted. The liquid crystal layer 120 and the color filter substrate 130 are stacked on the array substrate 110, and an overall structure is illustrated in FIG. 2.

As illustrated in FIG. 1, a plurality of gate wirings 115 receiving a scan signal and a plurality of data wirings 114 receiving a data signal cross each other in directions perpendicular to each other within an image region 101 on a body 110a of the array substrate 110. Thin film transistor T, and pixel electrodes 116 connected to the thin film transistors T are arranged at intersections.

In FIG. 1, for convenience, a single thin film transistor T and a single pixel electrode 116 are illustrated, but the thin film transistors T and the pixel electrodes 116 are arranged at the respective intersections.

Figure 2:
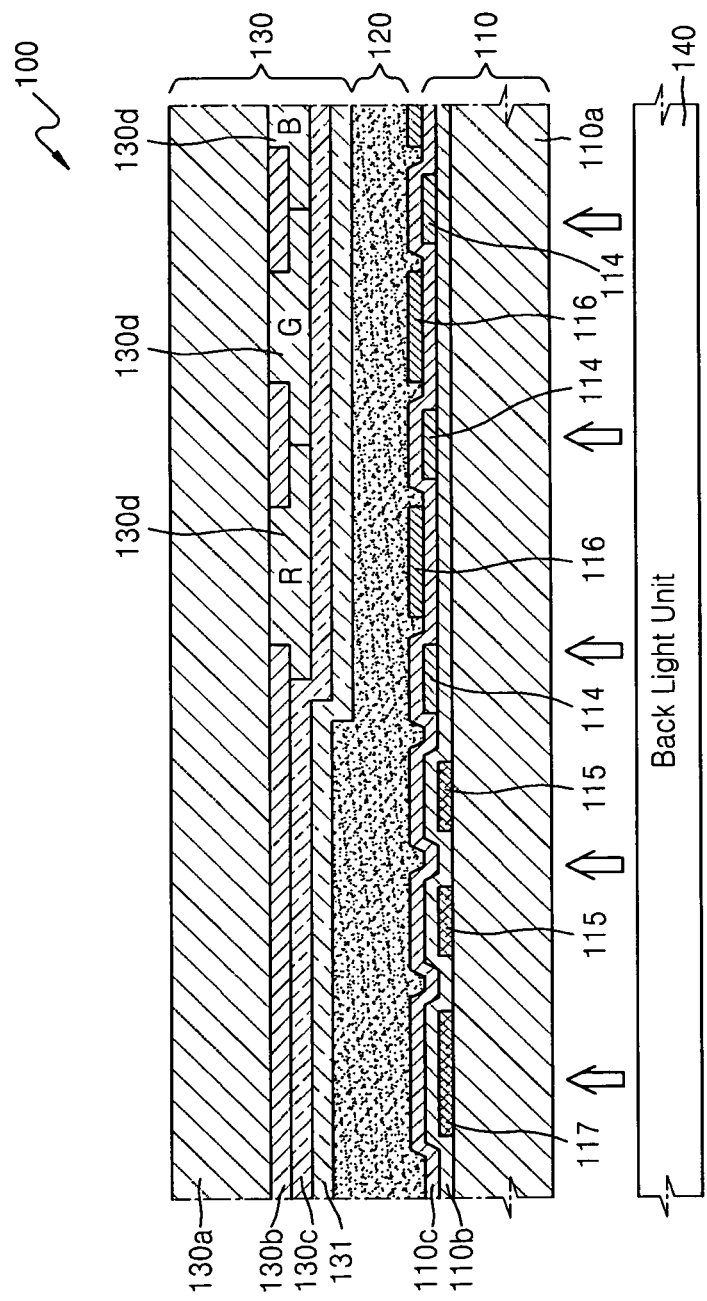
FIG. 2 is a cross-sectional view of the LCD apparatus taken along a line II-II of FIG. 1.

When the scan signal and the data signal are applied to each gate wiring 115 and each data wiring 114, respectively, the thin film transistor T disposed at an intersection transmits a voltage signal to the pixel electrode 116, and thus arrangement of liquid crystals of the liquid crystal layer 120 may be changed while an appropriate voltage is formed between the pixel electrode 116 and a common electrode 131 (see FIG. 2) of the color filter substrate 130 (see FIG. 2).

According to the arrangement of liquid crystals, light emitted from a backlight unit 140 is selectively transmitted through the liquid crystal layer 120 to realize a desired image.

A reference numeral 111 denotes a driving integrated circuit (IC) for applying an appropriate voltage to the pixel electrode 116 through the data wiring 114, the gate wiring 115 and the thin film transistors T, and for also applying an appropriate voltage to the common electrode 131 through a common voltage wiring 117 formed along an edge of the body 110a of the array substrate 110.

When voltages are applied to the data wiring 114, the gate wiring 115 and the common voltage wiring 117 through the driving IC 111, appropriate voltages are formed for changing the arrangement of liquid crystals of the liquid crystal layer 120 formed between the pixel electrode 116 and the common electrode 131 that are connected to the data wiring 114, the gate wiring 115 and the common voltage wiring 117.

Reference numerals 117a denote connectors that are formed on four corners of the common voltage wiring 117 in order to connect the common electrode 131 formed on the color filter substrate 130 to the common voltage wiring 117 formed on the array substrate 110. As illustrated in FIG. 2, the common voltage wiring 117 is formed on the array substrate 110, and the liquid crystal layer 120 is disposed between the pixel electrode 116 and the common electrode 131, wherein the common electrode 131 facing the pixel electrode 116 is formed on the color filter substrate 130. Thus, the common voltage wiring 117 and the common electrode 131 are connected to each other through the connectors 117a formed on four corners of the common voltage wiring 117.

In FIG. 2, a reference numeral 130a denotes a body of the color filter substrate 130, a reference numeral 130b denotes a black matrix for blocking light, a reference numeral 130c denotes a over-coating layer for covering a color filter 130d, and reference numerals 110b and 110c denote insulating layers.

Referring back to FIG. 1, the driving IC 111 is connected to a flexible circuit board 113 for connection with an external power source through a connection pad 112. Thus, the driving IC 111 receives power from the external power source through the flexible circuit board 113, and applies appropriate voltages to the data wiring 114, the gate wiring 115 and the common voltage wiring 117.

In this case, the common voltage wiring 117 and the driving IC 111 are connected to each other through the flexible circuit board 113, rather then being directly connected on the body 110a of the array substrate 110, in order to increase an electrical resistance of a connection path between the common voltage wiring 117 and the driving IC 111. When the common voltage wiring 117 and the driving IC 111 are connected through the flexible circuit board 113, as illustrated in FIG. 1, a connection path is increased, thereby increasing an electrical resistance of the connection path, compared to a case where the common voltage wiring 117 and the driving IC 111 are directly connected to each other on the body 110a of the array substrate 110.

Although static electricity is formed through the common voltage wiring 117, the driving IC 111 is barely shocked electrically.

For example, as described above, when a surge voltage is applied to the LCD apparatus 100 in order to perform a static-electricity test, a large amount of a current mainly flows to the driving IC 111 through the common voltage wiring 117. Thus, circuits are frequently damaged. In addition, during normal use, when static electricity is formed, a large amount of current is likely to flow to the driving IC 111 through the common voltage wiring 117.

When the common voltage wiring 117 and the driving IC 111 are connected to each other through the flexible circuit board 113, although static electricity is formed, electrical impact applied to the driving IC 111 is reduced.

Another method may include increasing a resistance of the common voltage wiring 117 itself. However, in this scenario, power consumption may be increased. Accordingly, without changing the resistance of the common voltage wiring 117, by connecting the driving IC 111 and the common voltage wiring 117 to each other through the flexible circuit board 113, electrical impact applied to the driving IC 111 may be reduced.

In a simulation, when the common voltage wiring 117 and the driving IC 111 are connected through the flexible circuit board 113, energy of static electricity is reduced by about ¼ times compared to the case where the common voltage wiring 117 and the driving IC 111 are directly connected to each other on the body 110a of the array substrate 110.

Accordingly, when the common voltage wiring 117 and the driving IC 111 are connected through the flexible circuit board 113, although static electricity is formed, the driving IC 111 may be prevented from being damaged. Thus, the LCD apparatus 100 may have high stability and reliability.

Figure 3:
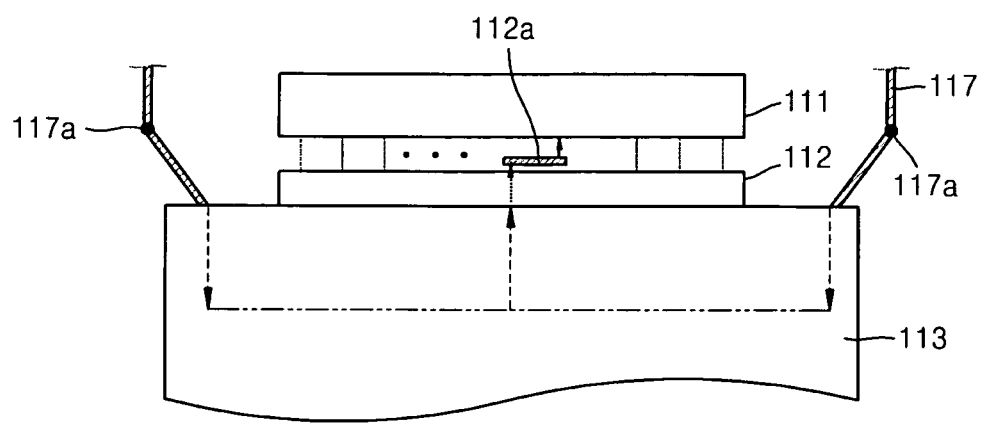
FIG. 3 is a cross-sectional view of a connection structure between a common voltage wiring and a driving IC, according to another embodiment.

FIG. 3 is a cross-sectional view of a connection structure between the common voltage wiring 117 and the driving IC 111, according to another embodiment.

The common voltage wiring 117 and the driving IC 111 are connected through the flexible circuit board 113, similar to FIG. 1. In addition, a dummy pad 112a is further disposed on a connection path between the common voltage wiring 117 and the driving IC 111.

In FIG. 1, the common voltage wiring 117 and the driving IC 111 are connected to each other through the flexible circuit board 113 and the connection pad 112. However, in FIG. 2, the dummy pad 112a is further disposed between the connection pad 112 and the driving IC 111. Thus, an electrical resistance is increased as much as by the dummy pad 112a.

Since an electrical resistance of a connection path between the common voltage wiring 117 and the driving IC 111 is further increased, the driving IC 111 is less likely to be damaged due to static electricity.

By way of summation and review, in a liquid crystal display (LCD), a pixel electrode corresponding to an anode is formed on the array substrate, a common electrode corresponding to a cathode is formed on the color filter substrate, and the pixel electrode and the common electrode are wired to connect to a driving integrated circuit (IC) so that an appropriate voltage is applied to change the arrangement of liquid crystals.

However, during the manufacture of a LCD apparatus, the driving IC may be frequently damaged due to static electricity.

When a static-electricity test is performed in order to assess whether errors are caused by static electricity during the manufacture of the LCD apparatus, an applied surge voltage is introduced to a driving IC through a common voltage wiring for connecting a common electrode and the driving IC to each other. Thus, as a result of the test, the driving IC is frequently damaged.

Accordingly, during the static-electricity test for preventing errors, the number of errors may actually increase. In addition, since a driving IC may be likely to be damaged due to static electricity during normal use, there is a need for a method of overcoming this problem.

One or more embodiments may be directed to liquid crystal display (LCD) apparatuses having an improved wiring structure for preventing circuits from being damaged due to static electricity.

Accordingly, electrical shock applied to the driving IC due to static electricity is reduced. Thus, circuits are prevented from being damaged, reducing product errors and improving reliability.

Exemplary embodiments have been disclosed herein, and although specific terms are employed, they are used and are to be interpreted in a generic and descriptive sense only and not for purpose of limitation.

What is claimed is:

1. An array substrate of a liquid crystal display (LCD) apparatus, the array substrate comprising:
    a pixel electrode on an array substrate body;
    a common voltage wiring on the array substrate body to apply a common voltage to a common electrode facing the pixel electrode;
    a driving integrated circuit (IC) for applying an appropriate driving voltage to the pixel electrode and the common electrode;
    a flexible circuit board for connecting the driving IC and an external power source to each other, the common voltage wiring being connected to the driving IC through the flexible circuit board; and
    a dummy pad on a connection path between the flexible circuit board and the driving IC, the dummy pad increasing a resistance of the connection path between the flexible circuit board and the driving IC.

2. The array substrate as claimed in claim 1, wherein the common voltage wiring does not include a wiring without connection through the flexible circuit board for direct connection with the driving IC on the array substrate body.

3. The array substrate as claimed in claim 2, wherein the flexible circuit board is connected to the driving IC through a connection pad on the array substrate body.

4. A LCD apparatus, comprising:
    a pixel electrode on an array substrate;
    a color filter substrate,
    a common electrode on the color filter substrate, the common electrode facing the pixel electrode; and
    a liquid crystal layer interposed between the array substrate and the color filter substrate,
    wherein the array substrate includes:
        an array substrate body on which the pixel electrode is disposed;
        a common voltage wiring on the array substrate body to apply a common voltage to the common electrode facing the pixel electrode;
        a driving IC for applying an appropriate driving voltage to the pixel electrode and the common electrode;
        a flexible circuit board for connecting the driving IC and an external power source to each other, the common voltage wiring being connected to the driving IC through the flexible circuit board; and
        a dummy pad on a connection path between the flexible circuit board and the driving IC, the dummy pad increasing a resistance of the connection path between the flexible circuit board and the driving IC.

5. The LCD apparatus as claimed in claim 4, wherein the common voltage wiring does not include a wiring without connection through the flexible circuit board for direct connection with the driving IC on the array substrate body.

6. The LCD apparatus as claimed in claim 5, wherein the flexible circuit board is connected to the driving IC through a connection pad on the array substrate body.

* * * * *